United States Patent
Corten et al.

(10) Patent No.: US 7,357,622 B2
(45) Date of Patent: Apr. 15, 2008

(54) METHOD AND INSTALLATION FOR EXTRACTING ENERGY FROM A FLOWING FLUID

(75) Inventors: Gustave Paul Corten, Alkmaar (NL); Pieter Schaak, Heerhugowaard (NL)

(73) Assignee: Stichting Energieonderzoek Centrum Nederland (NL)

( * ) Notice: Subject to any disclaimer, the term of this patent is extended or adjusted under 35 U.S.C. 154(b) by 0 days.

(21) Appl. No.: 10/560,795

(22) PCT Filed: Jun. 14, 2004

(86) PCT No.: PCT/NL2004/000421

§ 371 (c)(1),
(2), (4) Date: Apr. 10, 2006

(87) PCT Pub. No.: WO2004/111446

PCT Pub. Date: Dec. 23, 2004

(65) Prior Publication Data

US 2006/0232073 A1   Oct. 19, 2006

(30) Foreign Application Priority Data

Jun. 14, 2003   (NL) .................................. 1023666

(51) Int. Cl.
*F03D 11/04* (2006.01)
*F03D 7/04* (2006.01)
*F03B 15/06* (2006.01)

(52) U.S. Cl. .................. 416/1; 416/198 R; 416/201 R; 415/66

(58) Field of Classification Search .................. 290/44, 290/55; 415/66; 416/1, 120, 198 R, 201 A, 416/201 R
See application file for complete search history.

(56) References Cited

U.S. PATENT DOCUMENTS

| 4,193,005 | A * | 3/1980 | Kos et al. ..................... 290/44 |
| 6,619,918 | B1 * | 9/2003 | Rebsdorf ....................... 416/1 |
| 2006/0131889 | A1 * | 6/2006 | Corten et al. ................ 290/43 |
| 2006/0273595 | A1 * | 12/2006 | Avagliano et al. ........... 290/44 |

FOREIGN PATENT DOCUMENTS

| DE | 101 37 272 A1 | 7/2001 |
| DE | 101 37 272 | 2/2003 |
| DE | 10137272 A | 2/2003 |
| WO | WO 2004/011799 | 2/2004 |

* cited by examiner

*Primary Examiner*—Edward K. Look
*Assistant Examiner*—Nathan Wiehe
(74) *Attorney, Agent, or Firm*—Greenberg Traurig, LLP

(57) ABSTRACT

Turbine farm comprising at least a first turbine and at least a second turbine for energy extraction from a flowing fluid, wherein when the second turbine is on the lee side of the first turbine, under nominal power, the axial induction of the first turbine is lowered with respect to the second turbine, to reduce turbulence mainly at the location of the at least second turbine.

13 Claims, 1 Drawing Sheet

METHOD AND INSTALLATION FOR EXTRACTING ENERGY FROM A FLOWING FLUID

This application is a national stage filing under 35 U.S.C. 371 of International Application PCT/NL2004/000421 filed on Jun. 14, 2004 which claims priority from the Dutch Application No: 1023666 filed on Jun. 14, 2003. The entire teachings of the referenced Application is incorporated herein by reference. International Application PCT/NL2004/000421 was published under PCT Article 21(2) in English.

BACKGROUND

The present invention relates to a turbine farm. The invention furthermore relates to a method for this. Moreover, the invention relates to a control system and a control system program for implementing the method.

More generally, the invention relates to a method and/or installation for energy extraction from a flowing fluid. The term flowing fluid is used to refer both to the wind and to flowing (sea)water. The installation is understood to be a system of turbines with a control system (in particular a wind farm).

It is generally known that energy can be extracted from the wind using wind turbines. Both the size of the wind turbines and the number of wind turbines have been increasing rapidly in recent years. Increasingly frequently several turbines are being installed alongside one another in a so-called wind farm. Because of lack of space on land (especially in Europe), turbines are also more frequently installed offshore. Offshore wind farms that consist of tens of turbines or more have now been planned. Although the insight of the experts is divergent in this regard, wind energy is seen as one of the major energy sources of the future. If this becomes reality, many farms of hundreds of turbines will be needed. These types of farms are expensive and therefore it is extremely important that the production of the farms is high, that is to say justifies the costs.

Because a wind turbine extracts kinetic energy from the wind, the wind speed will have dropped behind the turbine. This effect is frequently referred to by the term wake effect or shadow effect and also by the term interference; the loss that the turbines undergo in the lee is termed shadow loss or wake loss. The wake loss in wind farms is frequently taken into account by introducing the farm efficiency figure. This figure gives the ratio between the yield with wake losses, compared with the yield without wake losses. Typical values are between 0.70 and 0.99.

In virtually all parts of the world certain wind directions occur more frequently than others. There is then said to be a dominant wind direction, which is defined here as the wind direction in which the major proportion of the annual production is harvested in partial load operation. The undisturbed wind direction is defined as the wind direction at the location of a turbine or farm, without the influence of that turbine or that farm. Incidentally, the wind direction varies substantially over a short timescale (seconds to minutes); therefore the term wind direction is used to refer not to the instantaneous value but to the averaged value, for example over 10 minutes.

According to present day theory, turbines extract the maximum amount of energy from a fluid if the fluid is decelerated to approximately $2/3$ of the original speed at the location of the turbine and to $1/3$ approximately 1 diameter behind the turbine. The fractional reduction in speed of $1/3$ of the original speed at the location of the rotor is termed the axial induction, which is indicated by the letter a. In the case of maximum energy extraction a is equal to $1/3$. By choosing the axial induction to be less than $1/3$, the turbine decelerates the wind to a lesser extent and the turbine concerned extracts less energy from the wind, which according to the prior art can be beneficial for the turbine behind it.

Present day wind turbines are frequently designed for an axial induction of approximately 0.28. The value is lower than the optimum because a substantial load reduction is achieved by this means, whilst the fall in the energy production is relatively slight. If a wind turbine reaches its maximum or nominal power at nominal wind speed, then provision is made in some way or other that the power does not increase further with increasing wind speed (above nominal wind speed). The control can be either passive or active and in both cases has the result that the axial induction falls with increasing wind speed. At wind speeds of 20 m/s to 25 m/s the axial induction can fall to below 0.1.

Following from the axial induction, an axial force is defined as the force in the rotor shaft direction exerted by the wind on the turbine. The axial force ($F_{ax}$) is associated with the axial induction via the relationship $F_{ax}=4a(1-a)F_{norm}$, where $F_{norm}$ is a force that is used for normalisation. This force is equal to $1/2\rho V^2 A$, where $\rho$ is the density of the fluid, V the fluid speed and A the rotor surface area that is traversed. If the rotor surface area and the density are known, the axial induction can therefore be determined from measurement of the axial force and the fluid speed.

If a first wind turbine extracts the maximum amount of energy from the wind it is normal that the wind speed can have dropped to less than 50% of the original speed a short distance behind the turbine (for example one diameter). Since the power that can be obtained from the wind is proportional to the third power of the wind speed, the drop in speed means that a second turbine that would be installed in that position behind the first wind turbine would at most be able to achieve only an eighth of the power, compared with the first turbine on the windward side.

In practice such dramatic drops in power rarely occur because the wind turbines are placed fairly far apart. The distance between turbines is usually 3 to 10 times the turbine diameter. Over that distance the slow wind in the wake mixes with faster wind around it, as a result of which the wind speed at the location of a subsequent turbine has not dropped too much compared with the original wind speed. In brief, the shadow effect decreases by increasing the distance between turbines.

The wake problem is not restricted solely to an adverse interaction between two wind turbines installed one after the other in the wind direction, but occurs to a more significant extent in wind farms in particular. The energy extracted by the wind turbines on the windward side in a farm, together with the loss of kinetic energy as a result of mixing (this concept is explained later), inevitably leads to a drop in speed in the atmospheric boundary layer in which the rest of the farm is located. There is said to be exhaustion of energy in the atmospheric boundary layer. In the broader sense there can also be said to be a shadow effect between different wind farms. An entire farm that is located in the lee with respect to another farm can be subject to a substantial reduction in production. Apart from the falls in output already mentioned, operation in the wake can also lead to more fatigue damage to wind turbines.

If the number of turbines located one after the other becomes large, increasingly larger distances between the turbines are needed to keep wake losses acceptable. This means that a large surface area is needed and that the cable lengths between the turbines, and thus the costs, increase. In the case of installation on land a greater distance between the turbines also means that longer roads have to be built, which signifies a further increase in costs. Although placing the wind turbines further apart helps against shadow losses, an appreciable fall in production by the turbines on the lee side in large farms will be unavoidable. The fall can be so large that a farm becomes uneconomic as a result. Losses of 30% or more are generally known from the literature.

In the state of the art a wind farm is frequently so designed that it extends mainly perpendicularly to the dominant wind direction, as a result of which shadow effects can be reduced. In practice, however, the arrangement of the wind turbines is also dictated by numerous other interests, such as: what land or sea surface area has been assigned to the wind turbine operator, what are the other functions of the area, what nuisance is caused by the turbines, how do existing power lines run, etc. Consequently, this option will also only be able to offer a limited solution to the abovementioned problems.

The publication by Steinbuch, M., Boer, de W. W., et al entitled 'Optimal Control of Wind Power Plants' in Journal of Wind Engineering and Industrial Aerodynamics, (27), Amsterdam, 1988, describes that the operation of wind turbines on the windward side of a farm with a blade tip speed lower than that at which the maximum amount of energy is extracted can lead to a rise in the total farm production. No physical explanation is given for the result confirmed by simulation.

In the thesis by Corten, G. P., entitled 'Flow Separation on Wind Turbine Blades', ISBN 90-393-2592-0, 8 Jan. 2001, it is stated that during mixing of the slow air in the wake with the fast air outside it the impulse of the two mass streams together is maintained but that some of the kinetic energy is lost as heat. In the case of a solitary wind turbine that is running at optimum operation, the mixing loss is approximately 50% of the power generated by the turbine, so that the kinetic energy that a wind turbine extracts from the flow is not equal to the energy generated but is one and a half times as much. In this publication it is proposed to choose the axial induction of the turbines on the windward side in a turbine farm to be 10% below the optimum value of 0.33 (i.e. a=0.30), so that the production of the entire farm increases.

Despite the above literature the prevailing opinion is that wake effects can be better modelled but cannot be reduced. This can be seen, for example, from Hutting, H., 'Samenvatting technisch onderzoek SEP-Proefwindcentrale' ('Summary of technical study on SEP test wind power station'), Kema-Industriele energie systemen, Arnhem, November 1994, in which the following conclusion is drawn: 'increasing production with a farm control system by taking account of wake interaction does not appear to be feasible'.

More recent confirmation of this standpoint can be seen from the minutes of a meeting held on 23 May 2002 at Risø National Laboratory, Denmark. Twenty experts, some of whom have been working on this topic since 1980, were at this meeting and all attention was focussed on the modelling of wake losses. According to the minutes the effects are large, but it is still not known how large and what precisely determines them. By improving the modelling it can be estimated more accurately in advance how much a large turbine farm in a specific position will produce. This information is, of course, extremely relevant to investors. During the meeting no attention was paid to options for reducing wake effects by operating the turbines in a different way.

To summarise, current thinking is that shadow effect gives rise to substantial falls in production, that placing wind turbines further apart is a remedy that leads to high costs (greater cable length and, on land, longer roads) and to a low power per unit surface area. Because space is scarce, this is a major disadvantage. Not only can less be generated on a given surface area, but many areas (that is to say locations) will also lose out in competition with other purposes if only low production is to be expected. The prevailing view is that although the problem can be better modelled it cannot be solved.

An additional problem of the state of the art is the following: as the axial induction of a turbine increases the turbulence in the wake also increases. Turbines that are in the wake of other turbines can register this (for example from anemometer measurements or from the fluctuating loads on the blades). As turbulence increases there is an increasingly fluctuating load on turbines, which is a disadvantage.

One aim of the present invention is to provide a turbine farm that combats the occurrence of turbulence and goes some way to resolving the problem of fatigue loading of the turbines.

SUMMARY

To this end, the invention provides a turbine farm comprising at least a first turbine and at least a second turbine for energy extraction from a flowing fluid, wherein the second turbine is on the lee side of the first turbine, under nominal power, the axial induction of the first turbine is lowered with respect to the second turbine, by turning the blade angles of a rotor of the first turbine towards a feathering position.

Unexpectedly, a solution is nevertheless advanced by means of the present invention. According to the invention this problem is combated. If the turbulence gives rise to undesirable loads (which can be seen from the recordings of anemometer measurements or from the fluctuating loads on the blades), the turbine generating the turbulence can be set to a lower axial induction. A system of turbines according to the invention could advantageously be controlled in this way.

It is proposed to lower the axial induction of one or more turbines in a turbine farm to values of less than 0.25, for example 0.2, or even 0.15. These values for the axial induction are averages over the surface area traversed by the turbine. In the case of a horizontal shaft turbine the values are averages over the part of the surface between 40% R and 95% R occupied by the rotor, where R is the radius of the rotor, so that substantial deviations from the average in the centre of a horizontal shaft turbine and at the tips can be precluded. The low values are comparable with making the turbine more transparent to the fluid, so that the speed of the fluid behind the turbine drops to a lesser extent and, as a supplementary aspect, the supply of energy for turbines in the lee therefore rises.

From numerical values it can be seen that the measure goes further than the reduction proposed in the abovementioned thesis. In addition, it is indicated how the fall in induction can be achieved.

An advantageous embodiment that can be used with current wind turbines is the reduction of the speed of revolution and/or turning the blade angles towards the feathering position. These measures can also be combined with the reduction of the chord of the blades. To indicate the extent to which the chord can be reduced according to the invention we define the chord characteristic as $Nc_r\lambda_r^2/r$.

In this expression N is the number of blades, $c_r$ the chord at a specific radial position r and $\lambda_r$ is the measure of local high speed, which, in turn, is defined as the ratio between the local blade speed and the undisturbed wind speed. In the case of turbines (with radius R) which (without taking account of farm losses) extract optimum power from the wind, the chord characteristic between 0.5R and 0.8R does not reach any values below 4.0. Normal values are between 4.2 and 5.0 for turbines with a rotor diameter of more than 50 m.

For smaller turbines the chord characteristic increases further. Various advantages are achieved by designing a turbine such that the chord characteristic is smaller. According to one embodiment according to the invention this chord characteristic reaches values lower than 3.75 or less, for example lower than 3.5 or even lower than 3.0.

According to one embodiment of a turbine according to the invention the integral of $Nc_r/(0.3rR)$ between 0.5R and 0.8R is less than 0.04, for example less than 0.036 and even less than 0.03. In formula form this integral is as follows:

$$\int_{0.5R}^{0.8R} \frac{Nc_r}{0.3rR} dr.$$

The advantages that are achieved with such turbines are both that the axial induction is low, as a result of which wake losses decrease, and that the loads on the blades are less, because the chord of the blades is relatively small. The latter also yields a loading advantage at the survival wind speed, the maximum wind speed that a turbine can survive.

Furthermore, the invention provides a method for operating a turbine farm, wherein lowering the axial induction of the first turbine with respect to the second turbine when the second turbine is on the lee side of the first turbine, under nominal power, to reduce turbulence mainly at the location of the at least second turbine by turning the blade angles of a rotor of the first turbine towards a feathering position.

In addition, the invention provides a control system for operating the turbine farm as described above, wherein the control system is able, when the second turbine is on the lee side of the first turbine, under nominal power, to lower the axial induction of the first turbine with respect to the second turbine by turning the blade angles of a rotor of the first turbine towards a feathering position.

The present invention also provides design software for a turbine farm as described above, wherein the software is able to add guiding elements to the installation, where turbines have a guiding function, and when the second turbine is on the lee side of the first turbine, under nominal power, the axial induction of the first turbine is lowered with respect to the second turbine by turning the blade angles of a rotor of the first turbine towards a feathering position, to calculate the influence thereof on the turbine farm.

Furthermore, the present invention provides control software for a turbine farm as described above, wherein the control software is able when the second turbine is on the lee side of the first turbine, under nominal power, to lower the axial induction of the first turbine with respect to the second turbine by turning the blade angles of a rotor of the first turbine towards a feathering position.

Furthermore, the present invention provides control software for a turbine farm as described above, characterised in that the control software is able when the second turbine is on the lee side of the first turbine, under nominal power, to lower the axial induction of the first turbine with respect to the second turbine to reduce turbulence mainly at the location of the at least second turbine.

Finally, the present invention provides a turbine provided with a control system as described above.

An advantage can be achieved by equipping a turbine farm with a control system that controls the axial induction of the turbines as a function of the wind direction: as a general rule, turbines that give rise to more farm loss (the turbines on the windward side) are set to lower axial induction values.

A turbine farm can also be constructed with a control system that reduces the axial induction of at least one turbine if the turbulence in the undisturbed wind is high. The advantage that is achieved in this way is that in such situations where the turbines are subjected to relatively substantial fluctuating load, less turbulence is added by the turbines, so that there is a relative fall in the fluctuating loads.

A turbine farm can be constructed with a control system that sets the axial induction of at least one turbine on the basis of, inter alia, the distance from other turbines in the wake and/or on the basis of the number of turbines in the wake.

According to one embodiment according to the invention, a turbine farm can be equipped with turbines with a lower axial induction on the lee side of the farm, based on a dominant wind direction. The setting of the axial induction can then be independent of wind direction.

The turbine farm according to the present invention has a width and a length. The width is measured perpendicularly to the dominant direction of flow of the fluid and the length is measured in the dominant direction of flow. The width is the greatest width spacing between two turbines and the length the greatest length spacing between two turbines in the turbine farm. The turbines between which the distances are measured must be in that part of the turbine farm within which there is an essentially regular pattern in the turbine positions. The turbine farm surface area then follows from the product of length and width. By adding all surface areas traversed by the turbines in the farm (in the case of two horizontal shaft turbines with a diameter of 100 m the surface area occupied is $2 \cdot \pi/4 \cdot 100^2$ m$^2$) the total surface area occupied by the turbine farm is obtained. In a turbine farm in which horizontal-shaft turbines are a distance 8D (eight diameters) apart, the surface area occupied is approximately 1.2% of the surface area of the farm. A turbine farm can be constructed more compactly by using the present invention. In turbine farms with more than 50 turbines, according to one embodiment of the invention the percentage surface area occupied can rise to more than 3%, in particular more than 5% and even to more than 10%.

A preferred embodiment according to the invention is that where an additional control system is not needed but where the turbines on the windward side are set to a lower axial induction than the turbines in the lee, so that part of the envisaged advantage is already achieved. This can be a good embodiment especially if there is a strongly dominant wind direction.

The turbine farm that is operated according to the invention will be subject to less wake loss than an installation according to the state of the art. Because the traditional way of limiting wake losses consists in increasing the distance between the energy-extracting elements (in particular wind turbines) a turbine farm thus becomes more expensive and gives a less efficient utilisation of surface area. By using the present invention a turbine farm can be made of more compact design, whilst the wake loss remains acceptable.

As every person skilled in the art understands, in addition to horizontal-shaft and vertical-shaft turbines the turbines can also be ladder turbines, but also, for example, flying turbines, translating turbines, turbines in combination with concentrators such as tip vanes or diffusers, electrostatic turbines, turbines in lighter than air vehicles, multi-rotor turbines on a tower and groups of turbines.

As has been seen, an advantageous installation and an associated advantageous method for extracting energy from the flow depends on many factors. When designing such an installation calculations must be carried out to select the various elements and position these in advantageous locations. This is, of course, a function of the characteristics of the passive or active elements used, their mutual positions, the terrain, meteorological parameters and a wide variety of other aspects, such as financial aspects and insurance aspects. The complexity and the large number of possible solutions provides the incentive for supporting this design process with design software. Design software with the special characteristic that guiding elements can be added to the installation and/or where turbines can have a guiding function and where the influence of these elements on the farm can be predicted can form part of the invention.

Once an energy-extracting installation (that is to say a turbine farm) has been designed, there are then a large number of associated variables, such as the axial induction, the speed of revolution, the blade angle, the angle of inclination, the circulation scale and the positions of turbines, to be selected. Optimum matching of all these variables is difficult to determine in advance. Therefore, control software is needed that tests a large number of combinations of settings, optionally based on specific physical insights. According to one embodiment of this software, parameters for these variables are varied in accordance with a specific strategy. The performance of the turbine farm is stored as a function of the parameters that can be set and the optimum is then sought for each wind speed and wind direction.

Other meteorological data such as the temperature distribution or the stability of the atmosphere also arise as possible parameters here. Starting from a local optimum found, parameters can be changed in order to find a better optimum.

The program can be self-learning and thus able to control the installation increasingly better. In this way a good picture of the control strategy is obtained in the course of time and a database is compiled that, in turn, can be functional for the adjustment of other energy-extracting installations, such as a turbine farm.

With this knowledge it is also possible to improve the design process for new turbine farms.

Further characteristics and features will be explained with reference to two figures.

FIG. 1 shows, diagrammatically, a plan view of a small wind farm of only two wind turbines;

FIG. 2 shows, diagrammatically, a plan view of a small wind farm according to the present invention.

A plan view of a small wind farm of only two wind turbines, that is to say a first turbine 1 and a second turbine 2, can be seen in FIG. 1.

The wind 5 has a given strength and direction as indicated by arrow 5. In this particular case the direction is parallel to the line from the front turbine 1 to the rear turbine 2.

DETAILED DESCRIPTION

Figure 1:
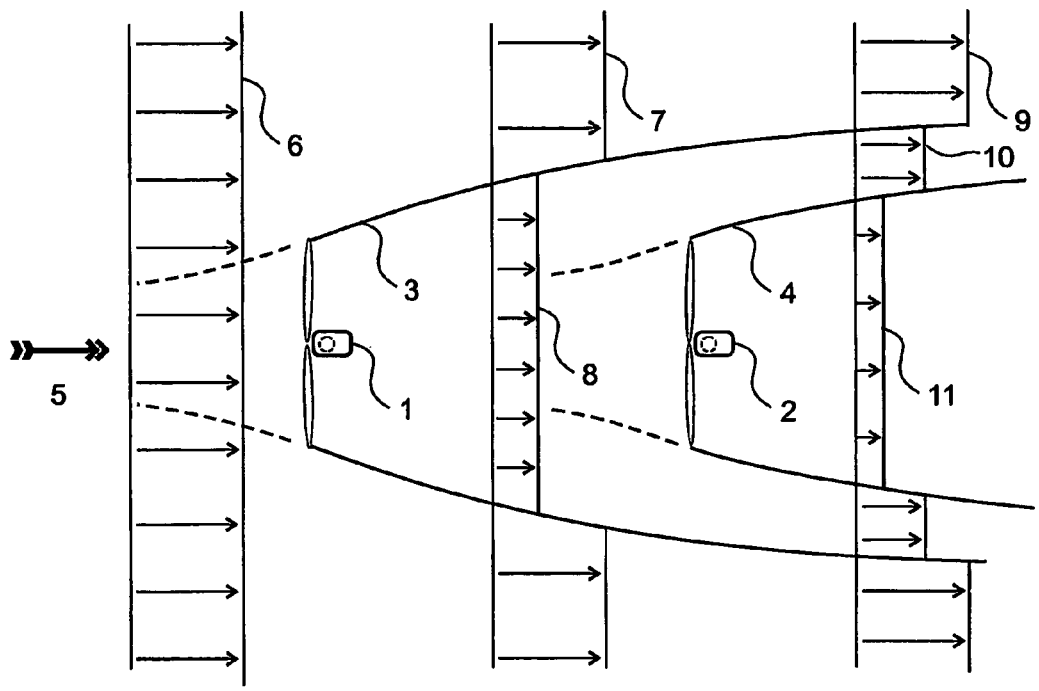
In FIG. 1 a sketch has been made of the situation where first turbine 1 extracts the maximum amount of energy from the wind, i.e. at an axial induction of $\frac{1}{3}$ in theory (and approximately 0.28 in practice).

The wind 5 has a uniform speed profile (6) before passing the first turbine 1. After passing the first turbine 1 the speed of the wind 5 that blows through the turbine decreases substantially in speed, which can be seen from the uniform speed profile 6 that after having passed turbine 1 changes into wind speed profile 7, 8, in which the central portion 8 of the profile represents the substantially decelerated wake air, which extends from the first turbine 1 within the contour 3 in the wind direction, and the outer portion 7 of the profile indicates the flow that essentially is not influenced by the first turbine.

The difference in speed between the portions 7 and 8 of the wind speed profile is large, as a result of which a great deal of turbulence is created. This is disadvantageous because it produces higher fluctuating loads on second turbine 2 and because more kinetic energy of the wind is lost as heat. The air stream in the central portion 8 of the wind speed profile serves as supply for the second turbine 2 in the lee, which has also been set to extract energy from the wind in the maximum manner. However, this is much less because the wind speed in the central portion 8 is so much lower than the original uniform speed 6. Behind the second turbine 2 a further speed profile (9-10-11) is produced in which the outer portions 9 show the least loss of speed, the intermediate portions 10 some loss of speed and the further central portion 11 where the speed has dropped substantially. Further central portion 11 of the profile represents the substantially decelerated wake air, which extends from the second turbine 2 within the contour 4 in the wind direction.

Figure 2:
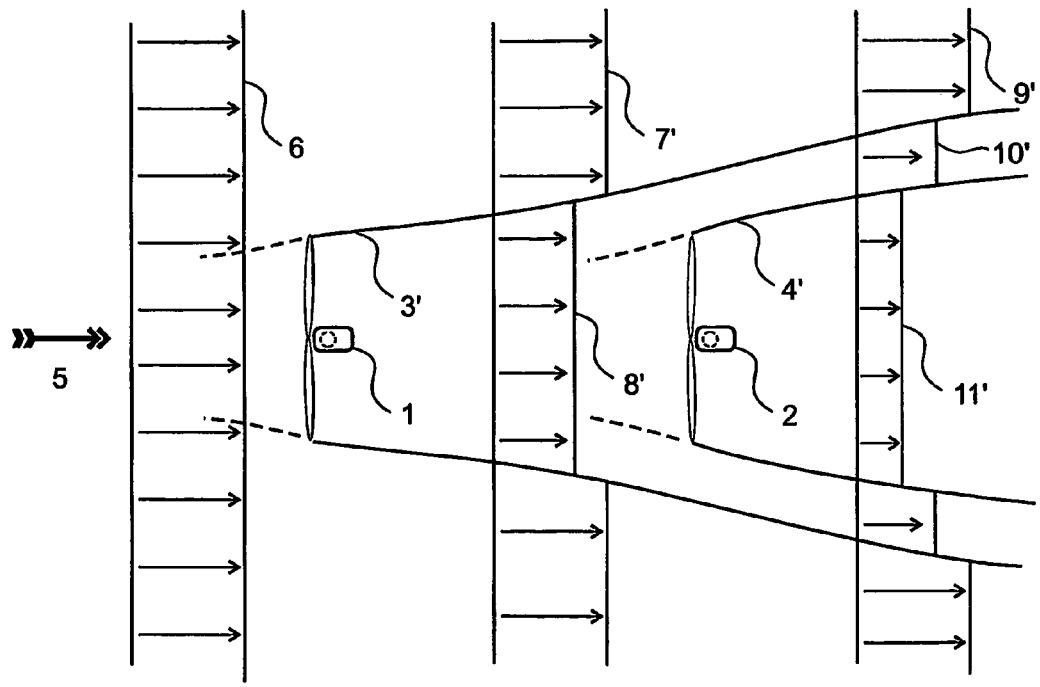

FIG. 2 shows, diagrammatically a plan view of a small wind farm according to the present invention. In both FIGS. 1 and 2 a plan view can be seen of a small wind farm of only two wind turbines. In FIG. 2 elements that are identical to elements in FIG. 1 are indicated by the same reference numerals.

The same situation as in FIG. 1 is shown in FIG. 2, but the axial induction of the first turbine 1 has now been reduced in accordance with an illustrative embodiment of the invention.

The wind 5 has a uniform speed profile (6) before passing the first turbine 1. After passing the first turbine 1 the speed of the wind 5 that blows through the turbine decreases substantially in speed, which can be seen from the uniform speed profile 6 that after having passed turbine 1 changes into wind speed profile 7', 8', in which the central portion 8' of the profile represents the decelerated wake air, which extends from the first turbine 1 within the contour 3' in the wind direction, and the outer portion 7' of the profile indicates the flow that essentially is not influenced by the first turbine.

The consequence of the reduced axial induction is that the speed in the central portion 8' in FIG. 2 is higher than the speed in the central portion 8 in FIG. 1.

The difference in speed between portion 7' and central portion 8' is also less, as a result of which less turbulence is created. The supply for the second turbine 2 is thus more advantageous because the wind speed is higher and the turbulence lower. This means a better relationship between yield and loads.

In addition, less kinetic energy has been lost from the wind as heat, which is beneficial for the yield of the turbine farm. Second turbine 2 in FIG. 2 has been set such that the maximum amount of energy is extracted from the wind because there is no further turbine at all behind the second turbine 2. A further speed profile 9', 10', 11' is thus produced behind the second turbine 2. If this profile is compared with the undisturbed supply of the uniform speed profile 6, it can then be stated (although this cannot be seen from the figure) that compared with the situation in FIG. 1 more useful energy can have been extracted from the flow 5 and/or that less kinetic energy has been lost from the wind.

Although the invention has been described above with reference to an example, a person skilled in the art will immediately appreciate that the advantage can also be achieved in other ways that fall within the scope of the appended claims.

A person skilled in the art will, moreover, understand that the invention described extends to installations such as turbine farms with underwater turbines that extract energy from a flow of water. Such a flow of water can be a flowing river, a tidal flow and any other flow of water found on earth from which energy can be extracted. Furthermore, it must be understood that the invention can also be employed together with the technology that has been described in Netherlands Patent Application NL 1021078. In that case in an advantageous embodiment according to the invention the lowering of the axial induction can be combined with the exertion of transverse forces on the flow so that fast air is guided through the farm. The transverse forces are, for example, generated with wind turbines positioned at an angle. Another obvious combination is that with cyclic blade angle adjustment. Both an adjustment which results in the induction at the top of the rotor being greater than that at the bottom (more advantageous wake) and a reversed cyclic adjustment (lower loads) can be advantageous.

The invention claimed is:

1. Turbine farm comprising at least a first turbine and at least a second turbine for energy extraction from a flowing fluid, further comprising a control system, wherein the control system is able, when the second turbine is on the lee side of the first turbine, below nominal power, to lower the axial induction (a) of the first turbine with respect to the second turbine so as to extract less energy, by turning the blade angles of a rotor of the first turbine towards a feathering position, wherein the control system sets the axial induction (a) of the at least one first turbine in the farm as a function of the wind direction, and of the distance to the at least one second turbine located in the lee.

2. The turbine farm of claim 1 wherein the axial induction (a) of the first turbine is reduced to about 0.25 or less.

3. The turbine farm of claim 1, wherein lowering of the axial induction (a) is further effected by reducing the speed of revolution of the rotor.

4. The turbine farm of claim 1, wherein lowering of the axial induction (a) is further effected by reducing the chord of the blades.

5. The turbine farm of claim 4 wherein at least the first turbine has blades, each blade having a chord characteristic, $$\frac{Nc_r\lambda_r^2}{r},$$

of less than 3.75, where r is a radial distance that runs between 0.5R and 0.8R, where R is the radius of the rotor.

6. The turbine farm of claim 1, wherein the control system sets the axial induction of the first turbine on the basis of a measure for the turbulence determined at the second turbine that is located essentially on the lee side of the first turbine.

7. The turbine farm of claim 1, wherein the control system optimises the farm performance measured in terms of maximum yield and/or minimum loads by adjusting the axial inductions (a) of individual turbines.

8. The turbine farm of claim 1, wherein at least one wind speed at least one first turbine, essentially located on the windward side of the farm based on the dominant wind direction, differs in terms of axial induction from at least one second turbine, essentially located on the lee side of the farm, by on average more than 0.05.

9. The turbine farm of claim 1 wherein the axial force of the entire farm is reduced such that the power of another farm located in the lee is increased.

10. Method for a turbine farm comprising at least one first turbine and an at least second turbine for energy extraction from a flowing fluid, wherein the method comprises lowering the axial induction (a) of the first turbine with respect to the second turbine so as to extract less energy, when the second turbine is on the lee side of the first turbine, below nominal power, by turning the blade angles of the rotor of the first turbine towards a feathering position, the axial induction (a) of at least one first turbine in the farm being set as a function of the wind direction, and of the distance to at least one second turbine located in the lee.

11. Control system for a turbine farm comprising at least a first turbine and at least a second turbine for energy extraction from a flowing fluid, wherein the control system is able, when the second turbine is on the lee side of the first turbine, below nominal power, to lower the axial induction (a) of the first turbine with respect to the second turbine so as to extract less energy by turning the blade angles of the rotor of the first turbine towards a feathering position, the axial induction (a) of at least one first turbine in the farm being set as a function of the wind direction, and of the distance to the at least one second turbine located in the lee.

12. The control system according to claim 11, wherein the control system sets the axial induction of at least one first turbine in the farm as a function of the wind direction.

13. Turbine provided with control system wherein the control system includes at least a first turbine and at least a second turbine for energy extraction from a flowing fluid, characterised in that the control system is able, when the second turbine is on the lee side of the first turbine, below nominal power, to lower the axial induction (a) of the first turbine with respect to the second turbine so as to extract less energy by turning the blade angles of the rotor of the first turbine towards a feathering position, the axial induction (a) of at least one first turbine in the farm being set as a function of the wind direction, and of the distance to the at least one second turbine located in the lee.

* * * * *